US012229852B2

(12) United States Patent
Kasper et al.

(10) Patent No.: US 12,229,852 B2
(45) Date of Patent: Feb. 18, 2025

(54) AUDIO REACTIVE AUGMENTED REALITY

(71) Applicant: Meta Platforms, Inc., Menlo Park, CA (US)

(72) Inventors: David Robert Kasper, Pacifica, CA (US); Catherine Yoo, San Francisco, CA (US); Matthew Alexander Nichols, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 151 days.

(21) Appl. No.: 17/245,514

(22) Filed: Apr. 30, 2021

(65) Prior Publication Data

US 2022/0351424 A1    Nov. 3, 2022

(51) Int. Cl.
*G06T 11/00*    (2006.01)
*G10L 21/013*   (2013.01)
*G10L 25/57*    (2013.01)
*G10L 25/90*    (2013.01)

(52) U.S. Cl.
CPC ............ *G06T 11/00* (2013.01); *G10L 21/013* (2013.01); *G10L 25/57* (2013.01); *G10L 25/90* (2013.01); *G10L 2021/0135* (2013.01)

(58) Field of Classification Search
None
See application file for complete search history.

(56) References Cited

U.S. PATENT DOCUMENTS

| 6,801,895 B1* | 10/2004 | Huang ................ G10L 25/48 348/468 |
| 2016/0300379 A1* | 10/2016 | Du ..................... G06T 13/205 |
| 2018/0336871 A1 | 11/2018 | Hamalainen et al. |
| 2022/0051448 A1* | 2/2022 | Steinwedel ...... H04N 21/41407 |

FOREIGN PATENT DOCUMENTS

WO    2020117823 A1    6/2020

OTHER PUBLICATIONS

EPO: International Search Report and Written Opinion for International Application No. PCT/US2022/024166, mailed Aug. 2, 2022, 9 pages.

* cited by examiner

*Primary Examiner* — Yanna Wu
(74) *Attorney, Agent, or Firm* — McDermott Will & Emery LLP

(57) ABSTRACT

Methods, systems, and storage media for augmenting a video are disclosed. Exemplary implementations may: receive a selection of an effect; receive user-generated content comprising video data and audio data; detect a characteristic of the audio data comprising at least a volume and/or a pitch of the audio data during a period of time; determine a series of numeric values based on the characteristic of the audio data during the period of time, individual numeric values of the series of numeric values being correlated with an amplitude of the volume and/or pitch at a discrete point within the period of time; and augment at least one of the video data and/or the audio data to include the effect based on the series of numeric values at discrete points in time within the period of time.

20 Claims, 6 Drawing Sheets

AUDIO REACTIVE AUGMENTED REALITY

TECHNICAL FIELD

The present disclosure generally relates to video processing, and more particularly to augmenting a video, e.g., using dynamic audio and/or other inputs.

BACKGROUND

Augmented reality (AR) may include a real-time view of a real-world environment overlain with digital information. In other words, a view of reality is augmented by digital information. For example, digital imagery of cat ears may overlay a live video of a person's face so that the person appears to have cat ears. The cat ears may move as the person's head tilts and rotates in the video. A frame of the video may be analyzed in real time to detect the presence, position, and movement of the person's head in the frame, which may then be used to determine the position and orientation of the digital cat ears in a subsequent frame.

BRIEF SUMMARY

The subject disclosure provides for systems and methods for video processing. According to aspects, live video may be augmented such that one or more objects within the video are distorted and/or controlled by an audio signal. For example, a live video may include a user's face and the user's voice may be used as the audio signal. As the volume and/or pitch of the user's voice changes, a shape of the user's eyes, nose, mouth, and/or other features may change or morph.

One aspect of the present disclosure relates to a method for augmenting a video. The method may include receiving a selection of an effect. The method may include receiving user-generated content including video data and audio data. The method may include detecting a characteristic of the audio data including at least a volume and/or a pitch of the audio data during a period of time. The method may include determining a series of numeric values based on the characteristic of the audio data during the period of time, individual numeric values of the series of numeric values being correlated with an amplitude of the volume and/or pitch at a discrete point within the period of time. The method may include augmenting at least one of the video data and/or the audio data to include the effect based on the series of numeric values at discrete points in time within the period of time.

Another aspect of the present disclosure relates to a system configured for augmenting a video. The system may include one or more hardware processors configured by machine-readable instructions. The processor(s) may be configured to receive a selection of an effect. The processor(s) may be configured to receive user-generated content including video data and audio data. The processor(s) may be configured to detect a characteristic of the audio data including at least a volume and/or a pitch of the audio data during a period of time. The processor(s) may be configured to determine a series of numeric values based on the characteristic of the audio data during the period of time, individual numeric values of the series of numeric values being correlated with an amplitude of the volume and/or pitch at a discrete point within the period of time. The processor(s) may be configured to augment at least one of the video data and/or the audio data to include the effect based on the series of numeric values at discrete points in time within the period of time.

Yet another aspect of the present disclosure relates to a non-transient computer-readable storage medium having instructions embodied thereon, the instructions being executable by one or more processors to perform a method for augmenting a video. The method may include receiving a selection of an effect. The method may include receiving user-generated content including video data and audio data. The method may include detecting a characteristic of the audio data including at least a volume and/or a pitch of the audio data during a period of time. The method may include determining a series of numeric values based on the characteristic of the audio data during the period of time, individual numeric values of the series of numeric values being correlated with an amplitude of the volume and/or pitch at a discrete point within the period of time. The method may include augmenting at least one of the video data and/or the audio data to include the effect based on the series of numeric values at discrete points in time within the period of time.

Still another aspect of the present disclosure relates to a system configured for augmenting a video. The system may include means for receiving a selection of an effect. The system may include means for receiving user-generated content including video data and audio data. The system may include means for detecting a characteristic of the audio data including at least a volume and/or a pitch of the audio data during a period of time. The system may include means for determining a series of numeric values based on the characteristic of the audio data during the period of time, individual numeric values of the series of numeric values being correlated with an amplitude of the volume and/or pitch at a discrete point within the period of time. The system may include means for augmenting at least one of the video data and/or the audio data to include the effect based on the series of numeric values at discrete points in time within the period of time.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figures 1A, 1B, 1C, 1D:
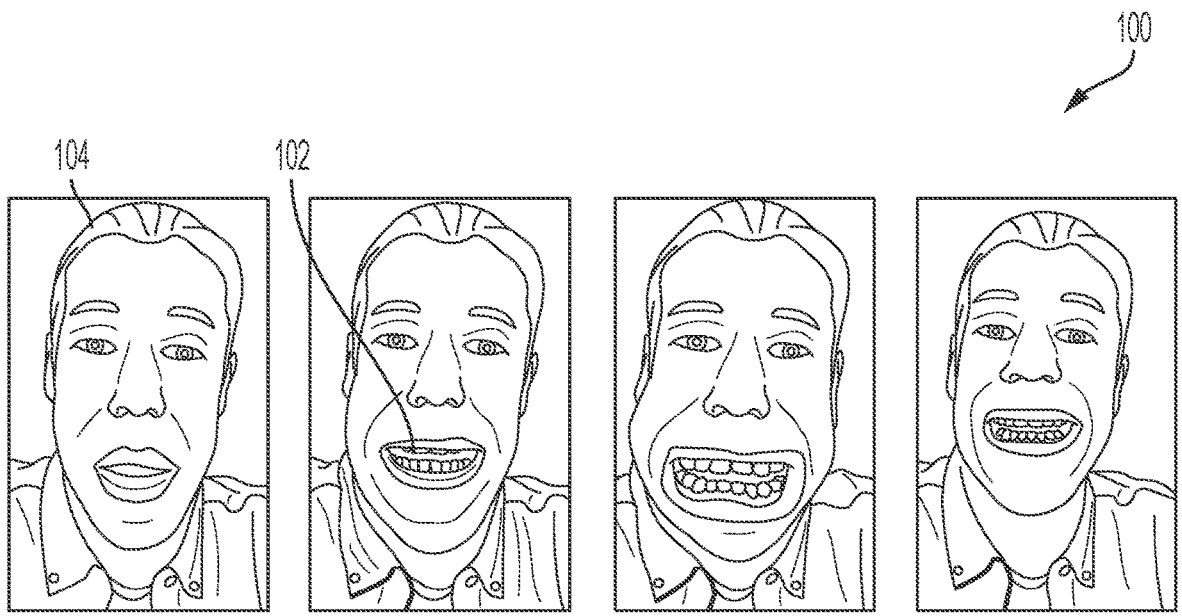
FIGS. 1A-1D illustrate frames of an exemplary augmented reality video in which a user's mouth is morphed in response to audio data, according to certain aspects of the present disclosure.
Figures 2A, 2B, 2C, 2D:
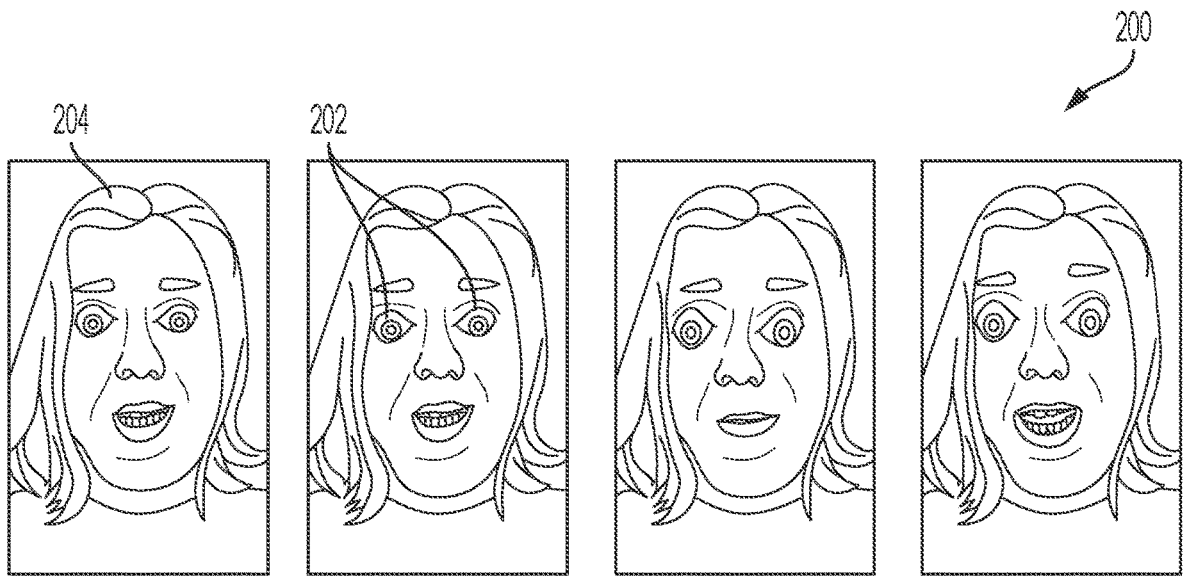
FIGS. 2A-2D illustrate frames of an exemplary augmented reality video in which a user's eyes are morphed in response to audio data, according to certain aspects of the present disclosure.
Figures 3A, 3B, 3C, 3D:
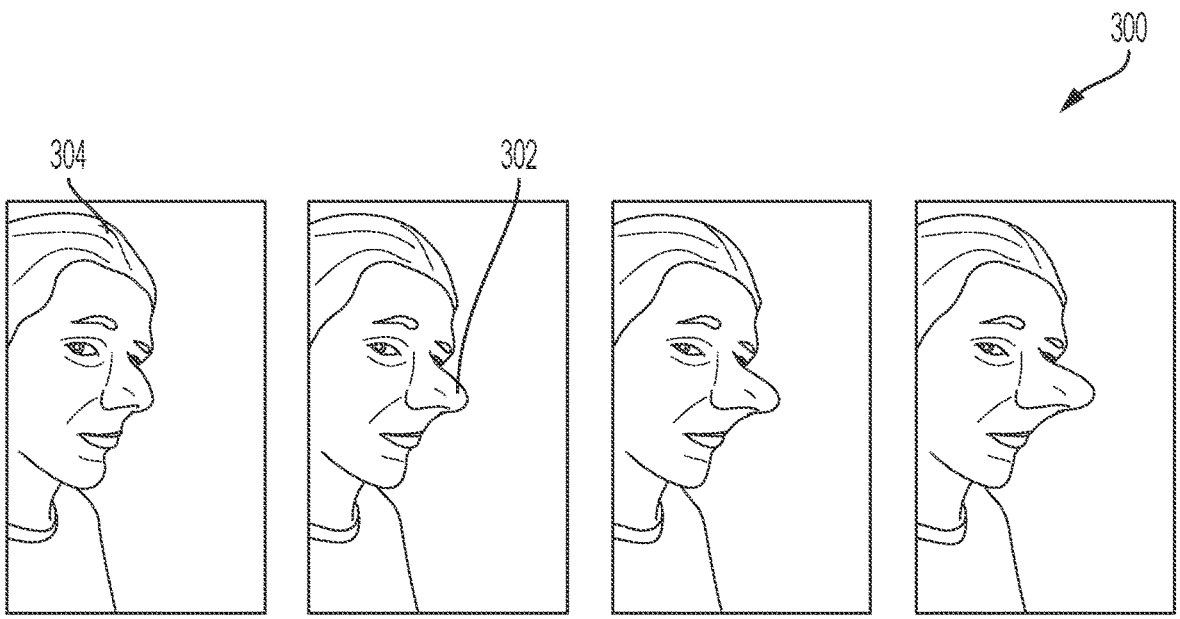
FIGS. 3A-3D illustrate frames of an exemplary augmented reality video in which a user's nose is morphed in response to audio data, according to certain aspects of the present disclosure.
Figures 4A, 4B, 4C, 4D:
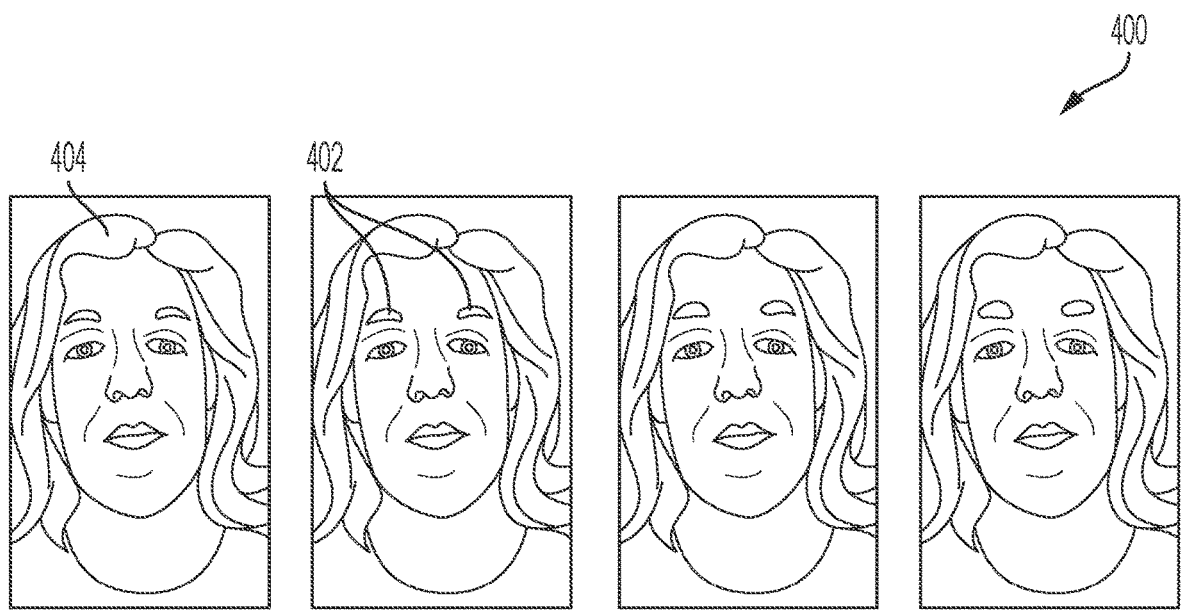
FIGS. 4A-4D illustrate frames of an exemplary augmented reality video in which a user's eyebrows are morphed in response to audio data, according to certain aspects of the present disclosure.
Figures 5A, 5B, 5C, 5D:
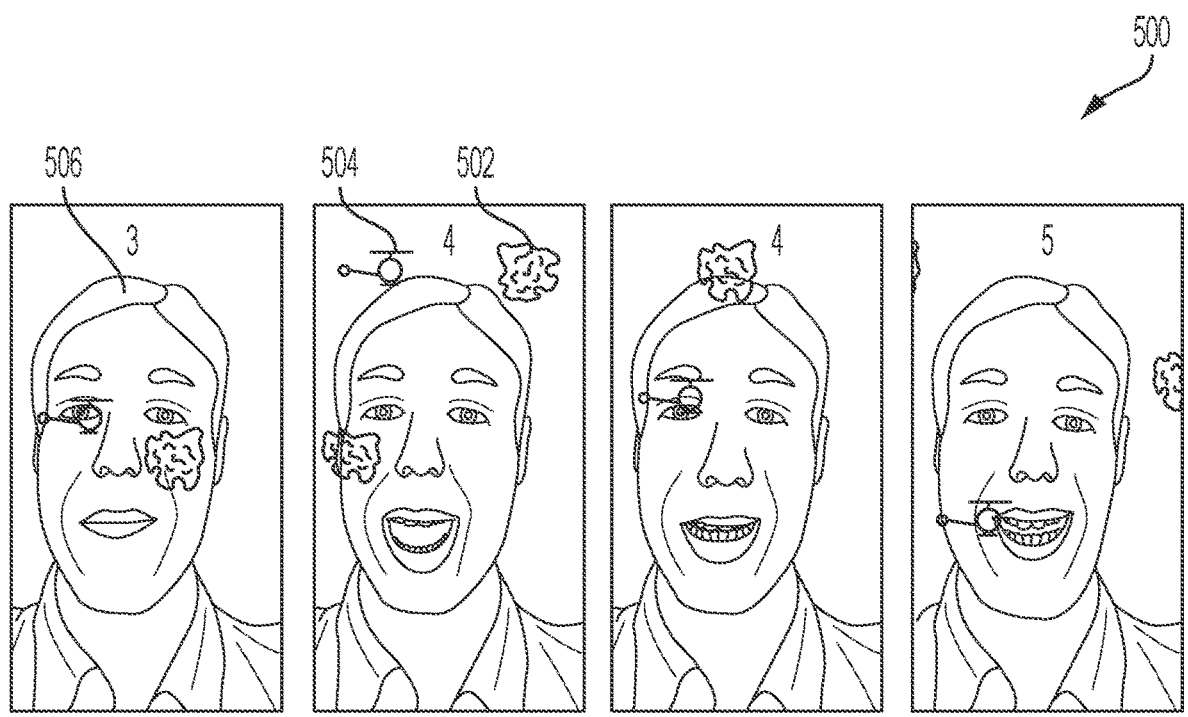
FIGS. 5A-5D illustrate frames of an exemplary augmented reality video in which a video game is controlled by audio data, according to certain aspects of the present disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

In conventional augmented reality systems, the digital overlay is responsive in real time to one single input, i.e., a video feed (e.g., of a real object or environment). The digital overlay moves responsive to movements in the real video feed, so a traditional AR effect is realized (e.g., cat ears appearing on a person's head). Besides moving in coordination with movements depicted in the real video feed, existing digital overlays are static in the sum of their content.

The subject disclosure provides for systems and methods for augmenting a video, e.g., using dynamic audio and/or other inputs. A user is allowed to select an audio source to affect video augmentation. For example, ambient sound and/or music tracks may be used to dynamically morph a shape of an object in a real-world video, thus adding entertaining and useful ways to interact with and/or control augmented videos.

Implementations described herein address shortcomings of conventional augmented reality systems by using additional input beyond video to which AR digital content is responsive. Exemplary implementations may utilize one or more of ambient sound of a user's environment (e.g., a user's voice), music (e.g., a song), and/or other audio data as an input for determining an AR experience. In some implementations, a user's face depicted in a real video feed may be morphed based on audio using a digital overlay. For example, based on changes in volume and/or pitch of the input audio, a shape of the user's face may change (e.g., mouth gets larger, nose gets longer, eyes get bigger, eyebrows raise or lower, and/or other morphing changes). By providing for such morphing of the user's facial features, the generated video becomes more interactive and entertaining for users. For example, the morphed features may appear funny and provide comic relief in addition to the audio content of the video. In this way, the experience of creating and watching the video may be further enhanced for users, which encourages further user engagement and enjoyment.

FIGS. 1A-1D illustrate frames of an exemplary augmented reality video 100 in which a user's mouth 102 is morphed in response to audio data, according to certain aspects of the present disclosure. The user's mouth 102 may morph from its natural size and shape to a larger size and modified shape. The morphing of the user's mouth 102 may be determined based on the voice of the user (e.g., user 104) shown in the augmented reality video 100. The user's voice may be captured by a microphone recording ambient sound in the user's environment such as audio data, which is used to generate augmented reality video 100. Higher volume and/or pitch in the user's voice may cause the user's mouth 102 to get larger and/or wider. As the user's voice gets softer and/or lower in pitch, the user's mouth 102 become smaller and eventually return to its natural size. Thus, while the user is speaking, singing, or making other vocalizations, the size and shape of the user's mouth 102 change as the volume and/or pitch of the user's voice changes.

According to additional aspects, the morphing of the user's mouth 102 may correspond to music. For example, the user 104 may select music to be played and, as the music is playing, the user's mouth 102 may morph based on the music. In an implementation, the mouth 102 may morph based at least in part on a beat and/or tempo of the music. The mouth 102 may also morph based on other aspects of the music, including, but not limited to, musical type, music volume, musical tone, musical pitch, musical melody, etc.

FIGS. 2A-2D illustrate frames of an exemplary augmented reality video 200 in which a user's eyes 202 are morphed in response to audio data, according to certain aspects of the present disclosure. The user's eyes 202 may morph from their natural size and shape to a larger size and modified shape. The morphing of the user's eyes 202 may be determined based on the voice of the user (e.g., user 204) shown in the augmented reality video 200. The user's voice may be captured by a microphone recording ambient sound in the user's environment such as audio data, which is used to generate augmented reality video 200. Higher volume and/or pitch in the user's voice may cause the user's eyes 202 to get larger and/or bulge outward. As the user's voice gets softer and/or lower in pitch, the user's eyes 202 become smaller and eventually return to their natural size. Thus, while the user is speaking, singing, or making other vocalizations, the size and shape of the user's eyes 202 change as the volume and/or pitch of the user's voice changes.

According to additional aspects, the morphing of the user's eyes 202 may correspond to music. For example, the user 204 may select music to be played and, as the music is playing, the user's eyes 202 may morph based on the music. In an implementation, the eyes 202 may morph based at least in part on a beat and/or tempo of the music. The eyes 202 may also morph based on other aspects of the music, including, but not limited to, musical type, music volume, musical tone, musical pitch, musical melody, etc.

FIGS. 3A-3D illustrate frames of an exemplary augmented reality video 300 in which a user's nose 302 is morphed in response to audio data, according to certain aspects of the present disclosure. The user's nose 302 may morph from its natural size and shape to a larger size and modified shape. For example, the user's nose 302 may protrude forward and become elongated, in addition to becoming larger as well. The morphing of the user's nose 302 may be determined based on music selected by the user (e.g., user 304) shown in the augmented reality video 300. The music may include a song selected from a collection of songs. The music may be playing and audible in augmented reality video 300. Higher volume and/or pitch in the music may cause the user's nose 302 to get longer and/or more bulbous. As the music gets softer and/or lower in pitch, the user's nose 302 becomes smaller and eventually return to its natural size. Thus, while the music is playing, the size and shape of the user's nose 302 change as the volume and/or pitch of the music changes.

According to additional aspects, the morphing of the user's nose 302 may be determined based on the voice of the user (e.g., user 304) shown in the augmented reality video 300. The user's voice may be captured by a microphone recording ambient sound in the user's environment such as audio data, which is used to generate augmented reality video 300. Higher volume and/or pitch in the user's voice may cause the user's nose 302 to get larger and/or extend/ protrude/elongate outward. As the user's voice gets softer and/or lower in pitch, the user's nose 302 may become shorter and eventually return to its natural size. Thus, while the user is speaking, singing, or making other vocalizations, the size, length, and/or shape of the user's nose 302 may change as the volume and/or pitch of the user's voice changes. In an implementation, the user's nose 302 may grow longer based on a raised tone of the user's voice so that it appears that the user is lying or being ingenuous.

FIGS. 4A-4D illustrate frames of an exemplary augmented reality video 400 in which a user's eyebrows 402 are morphed in response to audio data, according to certain aspects of the present disclosure. The user's eyebrows 402 may morph from their natural position to a position higher and further away from the user's eyes. The morphing of the user's eyebrows 402 may be determined based on music selected by the user (e.g., user 404) shown in the augmented reality video 400. The music may include a song selected from a collection of songs. The music may be playing and audible in augmented reality video 400. Higher volume and/or pitch in the music may cause the user's eyebrows 402 to get higher on the user's forehead. As the music gets softer and/or lower in pitch, the user's eyebrows 402 lower and eventually return to their natural size. Thus, while the music is playing, the vertical position of the user's eyebrows 402 change as the volume and/or pitch of the music changes.

According to additional aspects, the morphing of the user's eyebrows 402 may be determined based on the voice of the user (e.g., user 404) shown in the augmented reality video 400. The user's voice may be captured by a microphone recording ambient sound in the user's environment such as audio data, which is used to generate augmented reality video 400. Higher volume and/or pitch in the user's voice may cause the user's eyebrows 402 to appear as if the user is raising their eyebrows up along with the sound. As the user's voice gets softer and/or lower in pitch, the user's eyebrows 402 may return to their natural position on the user's face. Thus, while the user is speaking, singing, or making other vocalizations, the height of the user's eyebrows 402 in relation to the user's eyes may change as the volume and/or pitch of the user's voice changes.

FIGS. 5A-5D illustrate frames of an exemplary augmented reality video 500 in which a video game is controlled by audio data, according to certain aspects of the present disclosure. In the video game, projectiles (e.g., projectile 502) fly from right to left across the view of augmented reality video 500 at random heights from the bottom of the screen. A user-controlled avatar 504 moves vertically to avoid the projectiles as they pass by horizontally. The vertical movement of the user-controlled avatar 504 based on the voice of a user (e.g., user 506) shown in the augmented reality video 500. The user's voice may be captured by a microphone recording ambient sound in the user's environment as audio data, which is used to generate augmented reality video 500. Higher volume and/or pitch in the user's voice may cause the user-controlled avatar 504 to move higher away from the bottom of the frame. As the user's voice gets softer and/or lower in pitch, the user-controlled avatar 504 may move lower toward the bottom of the frame. Thus, during gameplay, by changing her vocal volume and/or pitch, the user can control the avatar 504 to navigate vertically and avoid the horizontal-moving projectiles (e.g., projectile 502).

According to additional aspects, the different parts of the user's face may move at the same time. For example, the morphing of the different parts of the user's face may be based on a combination of the user's voice, music, ambient sounds, etc. In an implementation, the morphing of one part of the user's face (e.g., the user's mouth 102) may be controlled by the user's voice, another part of the user's face (e.g., the user's eyes 202) may be controlled by music, and yet another part of the user's face (e.g., the user's nose 302) may be controlled by ambient sounds. It is understood that any combination of the user's voice, music, ambient sounds, and/or other audio data may be utilized to morph any combination of the different parts of the user's face in a variety of ways. It is further understood that the audio data may be configured to morph multiple parts of the user's face simultaneously. For example, the audio data may cause both the user's eyebrows 402 and the user's mouth 102 to morph simultaneously and independently of each other. It is further understood that other parts of the user's face that are not described may also be configured to similarly morph without departing from the scope of the disclosure.

Some implementations may include determine and/or obtain a three-dimensional mesh related to a human face (e.g., a user depicted in a real-world video). The three-dimensional mesh may have one or more redesigned features (e.g., a mouth that looks larger or a nose that looks longer). In some implementations, a value (e.g., a scalar) associated with a volume and/or pitch of audio data at a given point in time may be used scale a deformation of a redesigned feature. An energy meter may determine the value associated with the volume and/or pitch. The determine value may be transformed into a zero to one value as a transformation coefficient.

According to some implementations, a user's face rendered according to an auxiliary mesh that has a different shape than the user's actual face. Some implementations include a series of auxiliary meshes with different face shapes having different magnitudes of deformation of a given facial feature. The different magnitudes may establish a maximum deformation such that the given facial feature can deform only up to that maximum. Thus, if the transformation coefficient is zero, the user may appear in the video without any deformations. If the transformation coefficient is one, the user may appear in the video with the maximum deformation of the given facial feature. If the transformation coefficient is between zero and one, the user may appear in the video with some scaled, intermediate magnitude of distortion.

In some implementations, non-visual aspects of a video may be augmented based on audio data input. For example, if audio data is recorded from a user's environment such as the user's voice, that audio data may be transformed in a corresponding video. The user's voice may be changed to sound different (e.g., a high-pitched voice, a low-pitched voice, a voice of a famous person or character, etc.) based on the actual volume and/or pitch of the user's voice in the audio data. In some implementations, visual effects (e.g., facial feature morphing) and audio effects (e.g., changing the user's voice) may be included in the same augmented video.

According to some implementation, a user may open an application ("app") on his personal electronics device (e.g., Smartphone, tablet, laptop, etc.). The device may include a camera and microphone that are accessible via the app. The user may select an audio reactive effect to apply to video data recorded by the camera. The app may present a description of the selected audio reactive effect. The app may present instructions on how to interact with the selected audio reactive effect. The processing to augment the video with the selected audio reactive effect may be performed by the user's personal electronics device and/or at a server in communication with the user's personal electronics device. In some implementations, the app may present the augmented video in real time or near-real time. In some implementations, the app may record the real-world video such that a corresponding augmented version of the real-world video, with the selected audio reactive effect implemented, may be viewed and/or shared after initial recording is complete.

In some implementations, an audio reactive effect may be animated with a musical cadence. The animation may be presented to a user for a period of time to provide a visual instruction on how to interact with the audio reactive effect. The animation may play when the app is opened, when a new face appears in the camera's field of view, and/or when another trigger event occurs. The audio reactive effect shown in the automation may be selected randomly.

Figure 6:
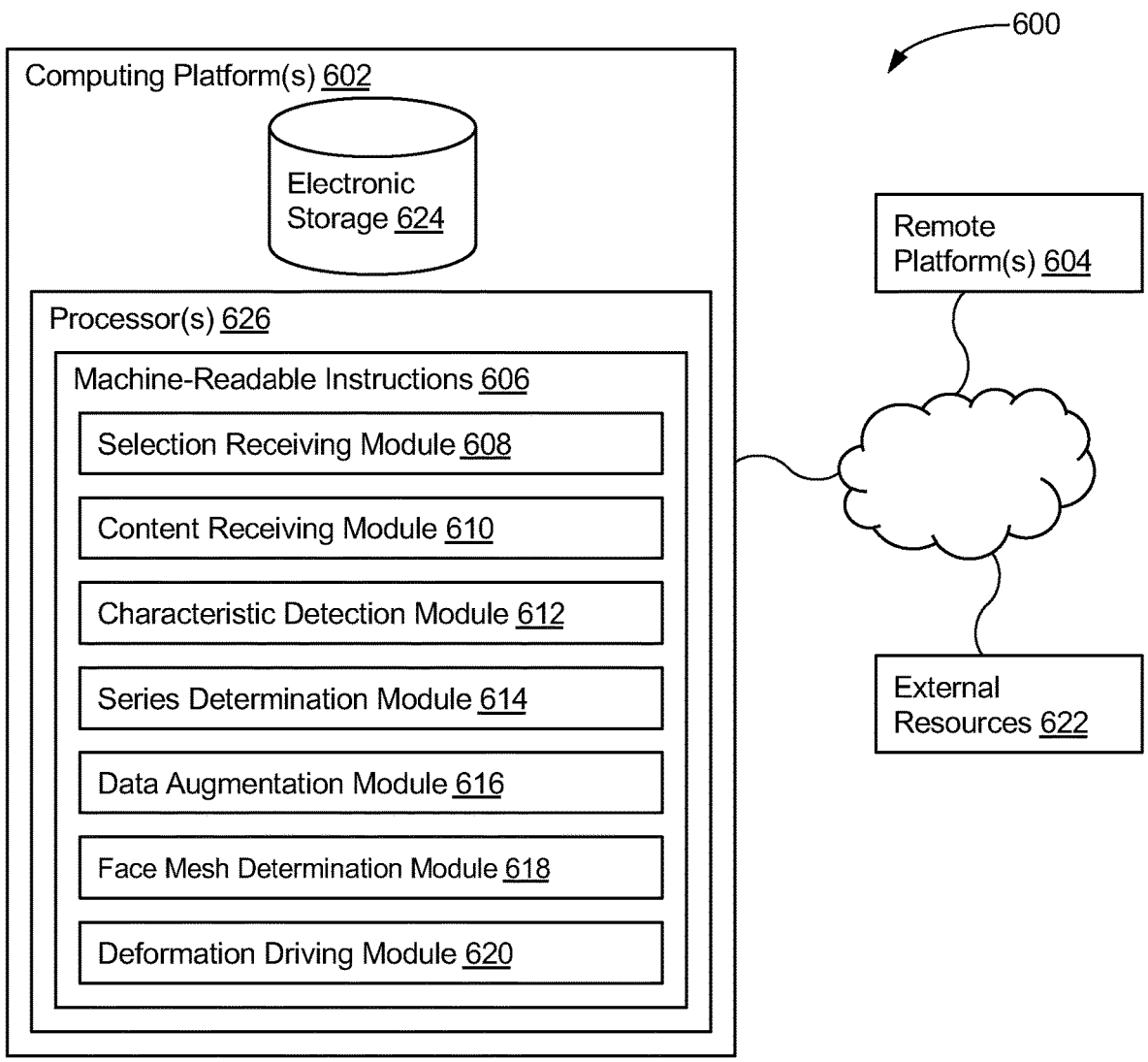
FIG. 6 illustrates a system configured for augmenting a video, according to certain aspects of the disclosure.

FIG. 6 illustrates a system 600 configured for augmenting a video, according to certain aspects of the disclosure. In some implementations, system 600 may include one or more computing platforms 602. Computing platform(s) 602 may be configured to communicate with one or more remote platforms 604 according to a client/server architecture, a peer-to-peer architecture, and/or other architectures. Remote platform(s) 604 may be configured to communicate with other remote platforms via computing platform(s) 602 and/or according to a client/server architecture, a peer-to-peer architecture, and/or other architectures. Users may access system 600 via remote platform(s) 604.

Computing platform(s) 602 may be configured by machine-readable instructions 606. Machine-readable instructions 606 may include one or more instruction modules. The instruction modules may include computer program modules. The instruction modules may include one or more of selection receiving module 608, content receiving module 610, characteristic detection module 612, series determination module 614, data augmentation module 616, face mesh determination module 618, deformation driving module 620, and/or other instruction modules.

Selection receiving module 608 may be configured to receive a selection of an effect. By way of non-limiting example, the effect may include at least one of morphing a user's nose, mouth, eyes, and/or eyebrows. By way of non-limiting example, the effect may include at least one of a video game, color modulation, simulated light shows, and/or changing a pitch of a user's voice based on the volume. The effect may include an embedded audio track. The effect may include an instructional effect. The effect may include at least one of beat detection and/or lyrics detection. The effect may include at least one of a series of mathematical transformations for using numeric values. By way of non-limiting example, the mathematical transformations may include one or more of a square root function, a multiply function, an exponential smoothing function, an averaging function, a running-average function. Receiving the selection of the effect may include receiving a user selection of the effect. Receiving the selection of the effect may include receiving a random selection of the effect. Changing the effect changes a way the video data and/or audio data may be augmented depending on a type of effect selected.

Content receiving module 610 may be configured to receive user-generated content including video data and audio data. The video data may include a user's face. By way of non-limiting example, the audio data may include music, a user's voice, or other sounds detected by a microphone. The audio data may be received during an input phase. The audio data may include pre-recorded audio data. The audio data may include ambient audio data from an environment of a user. The video data may include video data captured from an environment of a user.

Characteristic detection module 612 may be configured to detect a characteristic of the audio data including at least a volume and/or a pitch of the audio data during a period of time. The volume may be measured in decibels and/or other measurement units. Detecting the characteristic of the audio data may include analyzing the audio data during an analyzer phase. The analyzer phase may occur during or after the input phase. The period of time may be equal to a total length of the user-generated content. In some implementations, an energy meter may detect sound characteristics. In some implementations, the energy meter may take an incoming audio signal and outputs a scalar numeric value. The sound characteristics may include one or more of the amplitude of the volume, pitch, and/or other sound characteristic.

Series determination module 614 may be configured to determine a series of numeric values based on the characteristic of the audio data during the period of time, individual numeric values of the series of numeric values being correlated with an amplitude of the volume and/or pitch at a discrete point within the period of time. The numeric values increase or decrease with the amplitude of the volume may and/or the pitch of the audio data. An intensity of the effect may be based on the series of numeric values, such that higher values result in more intensity. Determining the series of numeric values may include converting the audio data to numerical values during the analyzer phase.

In some implementations, the numerical values may be conveyed as patches. In some implementations, the patches may include audio compression and/or audio effects. In some implementations, the numerical values may be conveyed as input parameters. In some implementations, an energy meter may detect sound characteristics. In some implementations, the energy meter may take an incoming audio signal and outputs a scalar numeric value.

Data augmentation module 616 may be configured to augment at least one of the video data and/or the audio data to include the effect based on the series of numeric values at discrete points in time within the period of time. Augmenting the at least one of the video data and/or the audio data may include transforming the audio data and/or the video data based on the numerical values during a transformation phase. The transformation phase may occur during or after the analyzer phase.

Face mesh determination module 618 may be configured to determine and/or obtain a face mesh based on the video data. The face mesh may include a deformed facial feature. In some implementations, the face mesh may include a collection or series of face meshes with different magnitudes of deformation of a given facial feature.

Deformation driving module 620 may be configured to drive a particular deformation on the face mesh based on the effect. By way of non-limiting example, driving the particular deformation of the face mesh may be based on a series of different pre-built face shapes, individual ones of the face shapes indicating a maximum deformation. In some implementations, the deformation of the face mesh scales between no deformation and the maximum deformation.

In some implementations, computing platform(s) 602, remote platform(s) 604, and/or external resources 622 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 602, remote platform(s) 604, and/or external resources 622 may be operatively linked via some other communication media.

A given remote platform 604 may include one or more processors configured to execute computer program modules. The computer program modules may be configured to enable an expert or user associated with the given remote platform 604 to interface with system 600 and/or external resources 622, and/or provide other functionality attributed herein to remote platform(s) 604. By way of non-limiting example, a given remote platform 604 and/or a given computing platform 602 may include one or more of a server, a desktop computer, a laptop computer, a handheld computer, a tablet computing platform, a NetBook, a Smartphone, a gaming console, and/or other computing platforms.

External resources 622 may include sources of information outside of system 600, external entities participating with system 600, and/or other resources. In some implementations, some or all of the functionality attributed herein to external resources 622 may be provided by resources included in system 600.

Computing platform(s) 602 may include electronic storage 624, one or more processors 626, and/or other components. Computing platform(s) 602 may include communication lines, or ports to enable the exchange of information with a network and/or other computing platforms. Illustration of computing platform(s) 602 in FIG. 6 is not intended to be limiting. Computing platform(s) 602 may include a plurality of hardware, software, and/or firmware components operating together to provide the functionality attributed herein to computing platform(s) 602. For example, computing platform(s) 602 may be implemented by a cloud of computing platforms operating together as computing platform(s) 602.

Electronic storage 624 may comprise non-transitory storage media that electronically stores information. The electronic storage media of electronic storage 624 may include one or both of system storage that is provided integrally (i.e., substantially non-removable) with computing platform(s) 602 and/or removable storage that is removably connectable to computing platform(s) 602 via, for example, a port (e.g., a USB port, a firewire port, etc.) or a drive (e.g., a disk drive, etc.). Electronic storage 624 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 624 may include one or more virtual storage resources (e.g., cloud storage, a virtual private network, and/or other virtual storage resources). Electronic storage 624 may store software algorithms, information determined by processor(s) 626, information received from computing platform(s) 602, information received from remote platform(s) 604, and/or other information that enables computing platform(s) 602 to function as described herein.

Processor(s) 626 may be configured to provide information processing capabilities in computing platform(s) 602. As such, processor(s) 626 may include one or more of a digital processor, an analog processor, a digital circuit designed to process information, an analog circuit designed to process information, a state machine, and/or other mechanisms for electronically processing information. Although processor(s) 626 is shown in FIG. 6 as a single entity, this is for illustrative purposes only. In some implementations, processor(s) 626 may include a plurality of processing units. These processing units may be physically located within the same device, or processor(s) 626 may represent processing functionality of a plurality of devices operating in coordination. Processor(s) 626 may be configured to execute modules 608, 610, 612, 614, 616, 618, and/or 620, and/or other modules. Processor(s) 626 may be configured to execute modules 608, 610, 612, 614, 616, 618, and/or 620, and/or other modules by software; hardware; firmware; some combination of software, hardware, and/or firmware; and/or other mechanisms for configuring processing capabilities on processor(s) 626. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 608, 610, 612, 614, 616, 618, and/or 620 are illustrated in FIG. 6 as being implemented within a single processing unit, in implementations in which processor(s) 626 includes multiple processing units, one or more of modules 608, 610, 612, 614, 616, 618, and/or 620 may be implemented remotely from the other modules. The description of the functionality provided by the different modules 608, 610, 612, 614, 616, 618, and/or 620 described below is for illustrative purposes, and is not intended to be limiting, as any of modules 608, 610, 612, 614, 616, 618, and/or 620 may provide more or less functionality than is described. For example, one or more of modules 608, 610, 612, 614, 616, 618, and/or 620 may be eliminated, and some or all of its functionality may be provided by other ones of modules 608, 610, 612, 614, 616, 618, and/or 620. As another example, processor(s) 626 may be configured to execute one or more additional modules that may perform some or all of the functionality attributed below to one of modules 608, 610, 612, 614, 616, 618, and/or 620.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 7:
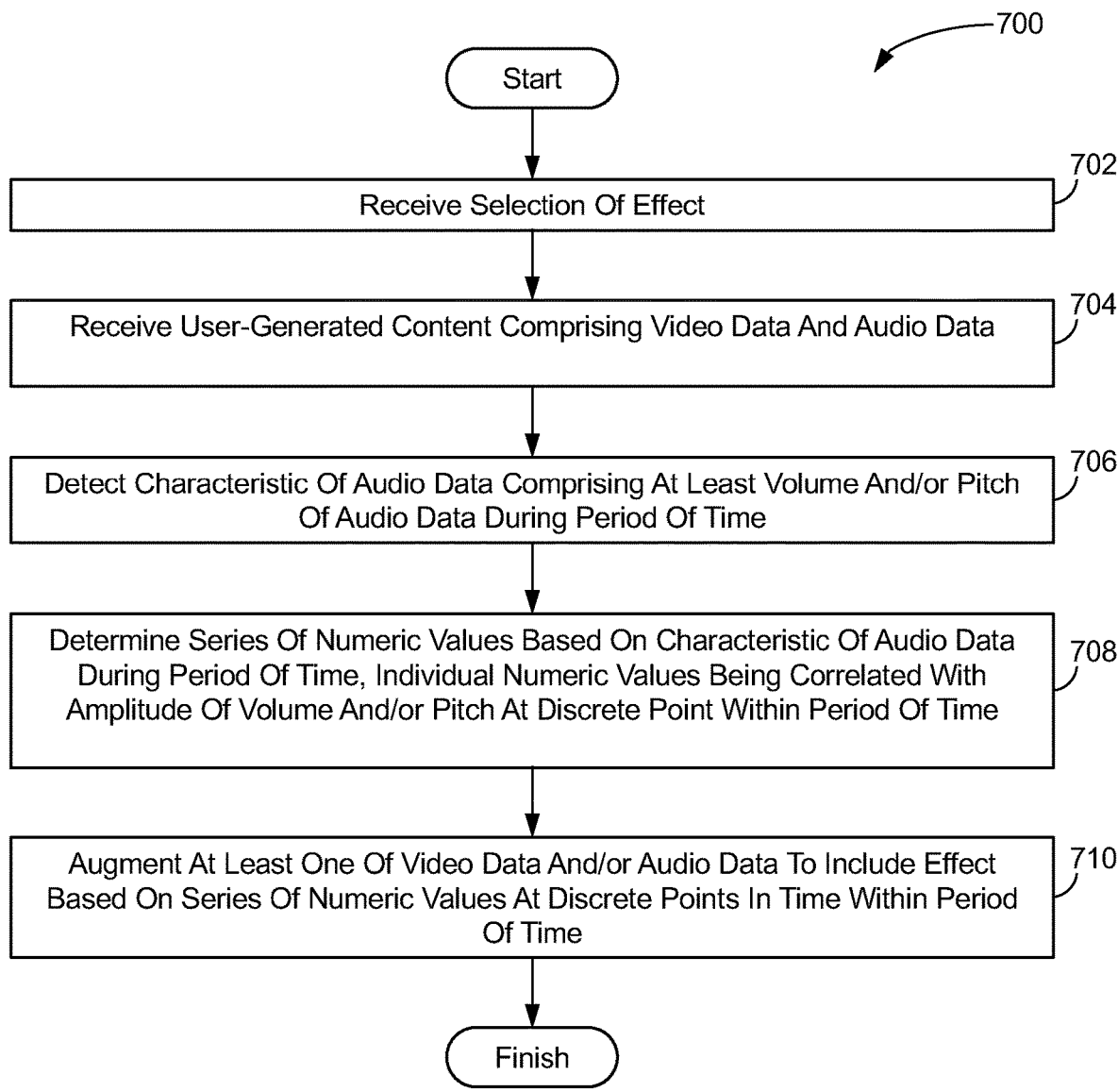
FIG. 7 illustrates an example flow diagram for augmenting a video, according to certain aspects of the disclosure.

FIG. 7 illustrates an example flow diagram (e.g., process 700) for augmenting a video, according to certain aspects of the disclosure. For explanatory purposes, the example process 700 is described herein with reference to FIGS. 1-6. Further for explanatory purposes, the steps of the example process 700 are described herein as occurring in serial, or linearly. However, multiple instances of the example process 700 may occur in parallel. For purposes of explanation of the subject technology, the process 700 will be discussed in reference to FIGS. 1-6.

At step 702, the process 700 may include receiving a selection of an effect. At step 704, the process 700 may include receiving user-generated content including video data and audio data. At step 706, the process 700 may include detecting a characteristic of the audio data including at least a volume and/or a pitch of the audio data during a period of time. At step 708, the process 700 may include determining a series of numeric values based on the characteristic of the audio data during the period of time, individual numeric values of the series of numeric values being correlated with an amplitude of the volume and/or pitch at a discrete point within the period of time. At step 710, the process 700 may include augmenting at least one of the video data and/or the audio data to include the effect based on the series of numeric values at discrete points in time within the period of time.

For example, as described above in relation to FIGS. 1-6, at step 702, the process 700 may include receiving a selection of an effect (e.g., a visual effect and/or an audio effect), through selection receiving module 608. At step 704, the process 700 may include receiving user-generated content including video data and audio data, through content receiving module 610. At step 706, the process 700 may include detecting a characteristic of the audio data including at least a volume and/or a pitch of the audio data during a period of time, through characteristic detection module 612. At step 708, the process 700 may include determining a series of numeric values based on the characteristic of the audio data during the period of time, individual numeric values of the series of numeric values being correlated with an amplitude of the volume and/or pitch at a discrete point within the period of time, through series determination module 614. At step 710, the process 700 may include augmenting at least one of the video data and/or the audio data to include the effect based on the series of numeric values at discrete points in time within the period of time, data augmentation module 616.

According to an aspect, the video data comprises a user's face. According to an aspect, the audio data comprises music, a user's voice, or other sounds detected by a microphone. According to an aspect, the effect comprises at least one of morphing a user's nose, mouth, eyes, and/or eyebrows. According to an aspect, the effect comprises at least one of a video game, color modulation, simulated light shows, and/or changing a pitch of a user's voice based on the volume. According to an aspect, the numeric values increase or decrease with the amplitude of the volume and/or the pitch of the audio data. According to an aspect, an intensity of the effect is based on the series of numeric values, such that higher values result in more intensity. According to an aspect, the volume is measured in decibels. According to an aspect, the audio data is received during an input phase. According to an aspect, detecting the characteristic of the audio data includes analyzing the audio data during an analyzer phase. According to an aspect, determining the series of numeric values includes converting the audio data to numerical values during the analyzer phase.

Figure 8:
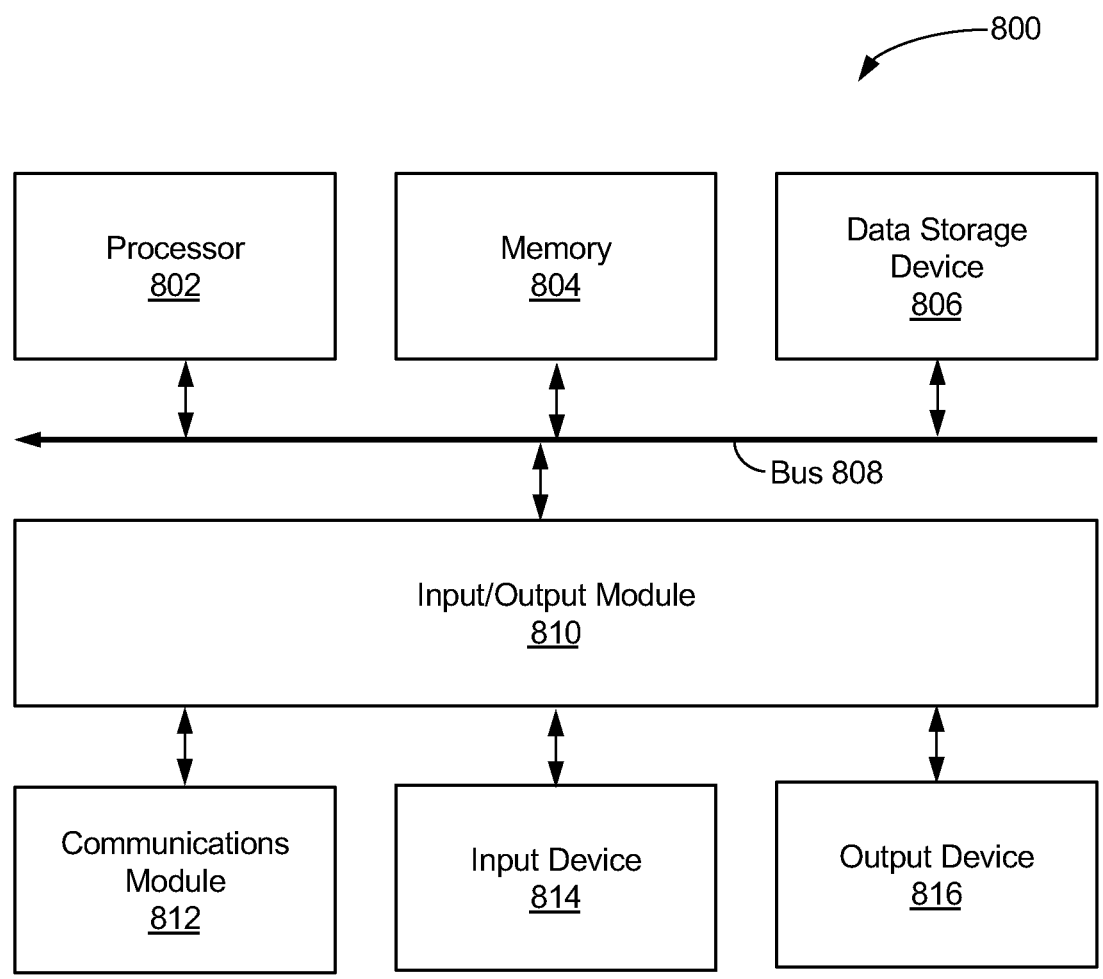
FIG. 8 is a block diagram illustrating an example computer system (e.g., representing both client and server) with which aspects of the subject technology can be implemented.

FIG. 8 is a block diagram illustrating an exemplary computer system 800 with which aspects of the subject technology can be implemented. In certain aspects, the computer system 800 may be implemented using hardware or a combination of software and hardware, either in a dedicated server, integrated into another entity, or distributed across multiple entities.

Computer system 800 (e.g., server and/or client) includes a bus 808 or other communication mechanism for communicating information, and a processor 802 coupled with bus 808 for processing information. By way of example, the computer system 800 may be implemented with one or more processors 802. Processor 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, code that creates an execution environment for the computer program in question, e.g., code that constitutes processor firmware, a protocol stack, a database management system, an operating system, or a combination of one or more of them stored in an included memory 804, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, special purpose logic circuitry.

The instructions may be stored in the memory 804 and implemented in one or more computer program products, i.e., one or more modules of computer program instructions encoded on a computer readable medium for execution by, or to control the operation of, the computer system 800, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions. Computer system 800 may be coupled via input/output module 810 to various devices. The input/output module 810 can be any input/output module. Exemplary input/output modules 810 include data ports such as USB ports. The input/output module 810 is configured to connect to a communications module 812. Exemplary communications modules 812 include networking interface cards, such as Ethernet cards and modems. In certain aspects, the input/output module 810 is configured to connect to a plurality of devices, such as an input device 814 and/or an output device 816. Exemplary input devices 814 include a keyboard and a pointing device, e.g., a mouse or a trackball, by which a user can provide input to the computer system 800. Other kinds of input devices 814 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 816 include display devices such as a LCD (liquid crystal display) monitor, for displaying information to the user.

According to one aspect of the present disclosure, the above-described gaming systems can be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in the main memory 804 causes processor 802 to perform the process steps described herein. One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 800 can include clients and servers. A client and server are generally remote from each other and typically interact through a communication network. The relationship of client and server arises by virtue of computer programs running on the respective computers and having a client-server relationship to each other. Computer system 800 can be, for example, and without limitation, a desktop computer, laptop computer, or tablet computer. Computer system 800 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 802 for execution. Such a medium may take many forms, including, but not limited to, non-volatile media, volatile media, and transmission media. Non-volatile media include, for example, optical or magnetic disks, such as data storage device 806. Volatile media include dynamic memory, such as memory 804. Transmission media include coaxial cables, copper wire, and fiber optics, including the wires that comprise bus 808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 800 reads game data and provides a game, information may be read from the game data and stored in a memory device, such as the memory 804. Additionally, data from the memory 804 servers accessed via a network the bus 808, or the data storage 806 may be read and loaded into the memory 804. Although data is described as being found in the memory 804, it will be understood that data does not have to be stored in the memory 804 and may be stored in other memory accessible to the processor 802 or distributed among several media, such as the data storage 806.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for augmenting a video, comprising:
   receiving a selection of an effect;
   receiving user-generated content comprising video data and audio data;
   detecting a characteristic of the audio data comprising at least a volume and/or a pitch of the audio data during a period of time;
   determining a series of numeric values based on the characteristic of the audio data during the period of time, individual numeric values of the series of numeric values being correlated with an amplitude of the volume and/or pitch at a discrete point within the period of time;
   determining a plurality of meshes to augment the video data and/or the audio data, wherein the plurality of meshes comprise at least: a primary mesh and an auxiliary mesh, wherein the auxiliary mesh and the primary mesh have different shapes, and a shape associated with the auxiliary mesh is defined by an energy meter configured to determine a transformation coefficient representing a scaled magnitude of distortion between a minimum level of distortion and maximum level of distortion; and
   augmenting at least one of the video data and/or the audio data to include the effect of transitioning between the plurality of meshes based on the individual numeric value of the series of numeric values at discrete points in time within the period of time.

2. The computer-implemented method of claim 1, wherein the video data comprises a user's face and/or a location of the user's face in a video frame.

3. The computer-implemented method of claim 1, wherein the audio data comprises music, a user's voice, or other sounds detected by a microphone.

4. The computer-implemented method of claim 1, wherein the effect comprises at least one of morphing a user's nose, mouth, eyes, and/or eyebrows.

5. The computer-implemented method of claim 1, wherein the effect comprises at least one of a video game, color modulation, simulated light shows, and/or changing a pitch of a user's voice based on the volume.

6. The computer-implemented method of claim 1, wherein the numeric values increase or decrease with the amplitude of the volume and/or the pitch of the audio data.

7. The computer-implemented method of claim 1, wherein an intensity of the effect is based on the series of numeric values, such that higher values result in more intensity.

8. The computer-implemented method of claim 1, wherein the volume is measured in decibels.

9. The computer-implemented method of claim 1, wherein the audio data is received during an input phase.

10. The computer-implemented method of claim 1, wherein detecting the characteristic of the audio data includes analyzing the audio data during an analyzer phase; and
    wherein determining the series of numeric values includes converting the audio data to numerical values during the analyzer phase.

11. A system configured for augmenting a video, the system comprising:
    one or more hardware processors configured by machine-readable instructions to: receive a selection of an effect;
    receive user-generated content comprising video data and audio data;
    detect a characteristic of the audio data comprising at least a volume and/or a pitch of the audio data during a period of time;
    determine a series of numeric values based on the characteristic of the audio data during the period of time, individual numeric values of the series of numeric values being correlated with an amplitude of the volume and/or pitch at a discrete point within the period of time;
    determine a plurality of meshes to augment the video data and/or the audio data, wherein the plurality of meshes comprise at least: a primary mesh and an auxiliary mesh, such that the auxiliary mesh and the primary mesh have different shapes, and a shape associated with the auxiliary mesh is defined by a an energy meter configured to determine a transformation coefficient representing a scaled magnitude of distortion between a minimum level of distortion and maximum level of distortion; and augment at least one of the video data and/or the audio data to include the effect of transitioning between the plurality of meshes based on the individual numeric value of the series of numeric values at discrete points in time within the period of time.

12. The system of claim 11, wherein the video data comprises a user's face.

13. The system of claim 11, wherein the audio data comprises music, a user's voice, or other sounds detected by a microphone.

14. The system of claim 11, wherein the effect comprises at least one of morphing a user's nose, mouth, eyes, and/or eyebrows.

15. The system of claim 11, wherein the effect comprises at least one of a video game, color modulation, simulated light shows, and/or changing a pitch of a user's voice based on the volume.

16. The system of claim 11, wherein the numeric values increase or decrease with the amplitude of the volume and/or the pitch of the audio data.

17. The system of claim 11, wherein an intensity of the effect is based on the series of numeric values, such that higher values result in more intensity.

18. The system of claim 11, wherein the volume is measured in decibels.

19. The system of claim 11, wherein the audio data is received during an input phase, wherein detecting the characteristic of the audio data includes analyzing the audio data during an analyzer phase; and wherein determining the series of numeric values includes converting the audio data to numerical values during the analyzer phase.

20. A non-transient computer-readable storage medium having instructions embodied thereon, the instructions being executable by one or more processors to perform a method for augmenting a video, the method comprising:

receiving a selection of an effect;

receiving user-generated content comprising video data and audio data;

detecting a characteristic of the audio data comprising at least a volume and/or a pitch of the audio data during a period of time;

determining a series of numeric values based on the characteristic of the audio data during the period of time, individual numeric values of the series of numeric values being correlated with an amplitude of the volume and/or pitch at a discrete point within the period of time;

determining a plurality of meshes to augment the video data and/or the audio data, wherein the plurality of meshes comprise at least: a primary mesh and an auxiliary mesh, such that the auxiliary mesh and the primary mesh have different shapes, and a shape associated with the auxiliary mesh is defined by a an energy meter configured to determine a transformation coefficient representing a scaled magnitude of distortion between a minimum level of distortion and maximum level of distortion; and augmenting at least one of the video data and/or the audio data to include the effect of transitioning between the plurality of meshes based on the individual numeric value of the series of numeric values at discrete points in time within the period of time.

\* \* \* \* \*